Sept. 10, 1968

H. A. DALIK 3,400,837

AUTOMATIC FEEDING AND DISCHARGING SYSTEM
FOR MACHINE TOOLS

Filed June 22, 1967

INVENTOR
HERBERT A. DALIK

BY *Finnegan & Henderson*

ATTORNEYS

Sept. 10, 1968  H. A. DALIK  3,400,837
AUTOMATIC FEEDING AND DISCHARGING SYSTEM
FOR MACHINE TOOLS
Filed June 22, 1967  4 Sheets-Sheet 3

INVENTOR
HERBERT A. DALIK

BY *Finnegan & Henderson*

ATTORNEYS

INVENTOR
HERBERT A. DALIK
BY Finnegan & Henderson
ATTORNEYS

United States Patent Office 3,400,837
Patented Sept. 10, 1968

3,400,837
AUTOMATIC FEEDING AND DISCHARGING SYSTEM FOR MACHINE TOOLS
Herbert A. Dalik, Stow, Ohio, assignor to The Flintkote Company, New York, N.Y., a corporation of Massachusetts
Filed June 22, 1967, Ser. No. 648,131
10 Claims. (Cl. 214—1)

ABSTRACT OF THE DISCLOSURE

A pipe handling system for transferring pipe to and from a machine tool. The system automatically removes pipe, one at a time, from a feed table containing a plurality of pipes, aligns them with a respect to the machine tool, feeds them in sequence to the machine tool, machines them, and discharges them from the machine tool upon completion of the machining operation.

---

This invention relates to a system that automatically orients cylindrical workpieces of substantial length, feeds them in sequence to a machine tool, machines them, and discharges them from the machine tool upon completion of the machining operation.

To form water pressure main lines, drain lines, sewer lines, and other continuous conduits, pipe sections of hardened, compressed, fibro-cement composition, and more particularly pipe sections of asbestos-cement, are joined together with the pipe couplings or sleeves of similar composition. The pipe sections must be joined by the couplings in a leakproof manner, and the joints must be capable of containing fluids in which the pressures may range as high as 300 p.s.i.

An asbestos-cement coupling, which is designed to provide the desired leakproof connection between sections of asbestos-cement pipe, is described in U. S. Patent 2,738,992 to Heisler. This coupling has two (2) internal annular grooves of a specific configuration on either end of the coupling. Each groove contains a resilient gasket of rubber, or the like, to seal the end surface of the pipe section against the internal surface of the coupling.

To ensure a leakproof connection between the pipe section and the coupling, however, it is desirable to externally machine the end of the pipe to form a shoulder or seat on which the gasket in the coupling can rest. The machined ends of the pipe further permit the pipe sections to be joined by the pipe coupling with a minimum of effort.

In the past machine tool operators have machined rods, tubes, pipes, and other similar workpieces of substantial length by manually inserting the workpieces between axially aligned chucks of a machine tool or lathe and then manually removing them once the machining operation is complete. In the machining of asbestos-cement pipe, in particular, at least two (2) machine tool operators have been required, because the weight and substantial length of the pipes makes them cumbersome to handle.

It has therefore been necessary for these operators to perform a series of operations, including the steps of: orienting the length of pipe with respect to the machine tool, loading the pipe on the machine tool chucks, starting the machine, advancing the cutting tools to perform the desired machining operation on both ends of the pipe, stopping the machine, and finally removing the machined pipe. Valuable operating time is thus lost in this method of operation, because the machine necessarily remains idle for substantial periods of time while the operators perform the required steps in the machining operation. In addition, a considerable amount of physical effort is expended on the part of the operators in performing these steps in the machining operation, and, since control of these operations in manual, imprecise and nonuniform machining sometimes results.

It is therefore desirable to provide an automatic system for feeding pipe lengths to a machine tool and for discharging machined pipes from the tool to relieve the machine operators from having to manually control the machine and to increase the efficiency, economy, precision, and uniformity of the machining operation. With an automatic feeding and discharging system, the operators need only supply unmachined pipe to the system. By automating the machine cycle, including the orienting, feeding, machining, and discharging of the pipe, the machine operators are relieved of the responsibility for the adequacy, precision, and uniformity of the machining operation and an increase in the quality and quantity of machined pipes produced is realized.

It is accordingly a primary object of this invention to provide a new and improved system that automatically orients cylindrical workpieces of substantial length, feeds them in sequence to a machine tool, machines them, and discharges them from the machine tool, whereby an entire machining operation can be automatically performed in a precise, efficient, uniform, quick, and trouble-free manner.

It is another object of one embodiment of this invention to provide an automatic system that orients pipe lengths, feeds them in sequence to a machine tool, machines them, and discharges them from the machine tool, thereby relieving the machine operators of the time, effort, and responsibility of having to manually perform these steps in a machining operation.

Still another object of one embodiment of this invention is to provide an automatic system for orienting asbestos-cement pipe sections, feeding them in sequence to a pipe lathe, machining them, and discharging them from the lathe, the system being adaptable to any size pipe and any conventional size pipe lathe.

Yet another object of one embodiment of this invention is to provide an automatic system for removing uncachined lengths of pipe from a feed table containing a plurality of unmachined pipes, aligning the pipes with respect to a machine tool, feeding them in sequence to a machine tool, machining them, and discharging them from the machine tool upon completion of the machining operation.

A further object of this invention is to provide a new and improved orienting, feeding, and discharging system for machining cylindrical workpieces of substantial length that is simplified in construction and operation over prior art systems; that is reliable, efficient, and economical; that reduces maintenance costs and wear and tear on the machine tool; and that increases the quality and quantity of production of the workpieces.

Additional objects and advantages of this invention will be set forth in part in the description which follows and in part will be obvious from the description or may be learned by practice of the invention, the objects and advantages being realized and attained by means of the machines, instrumentalities, devices, and combinations particularly pointed out in the appended claims.

To achieve the foregoing objects and in accordance with its purpose, this invention, as embodied and broadly described, comprises: an automatic system for use with a machine tool having an axis and a pair of axially-aligned chucks for securing a cylindrical workpiece at its ends for rotary movement on the machine tool axis. The system automatically orients the workpieces, feeds them in sequence to the machine tool for machining, and automatically discharges machined workpieces from the machine tool upon completion of the machining operation.

This system includes a downwardly inclined feed table of sufficient length and inclination to impart rolling motion to a plurality of unmachined workpieces thereon in a direction normal to and toward the machine tool axis. Gating means are provided for stopping the plurality of unmachined workpieces rolling down the inclined feed table at an intermediate holding position on the feed table and for releasing the workpieces one at a time from the intermediate holding position. Aligning means are further provided at the lower end of the feed table for arresting movement of a workpiece at a workpiece-aligning position after its release by the gating means and for aligning the workpiece with respect to the machine tool axis. The aligning means releases the workpiece after it has been aligned and permits it to advance to a machine-charging position adjacent the machine tool chucks.

A machine cycling means is also provided for actuating and controlling the gating means and the aligning means to feed and align workpieces in sequence to the machine-charging position.

The system further includes a machine charging wheel having a plurality of spaced radial arms separated by indentations. The wheel is rotatably mounted on an axis parallel to and spaced apart from the machine tool axis and is rotated by the machine cycling means to charge an unmachined workpiece from the machine-charging position to a workpiece-machining position that is concentric with the axis of the machine tool chucks and, simultaneously, to discharge a machined workpiece from the workpiece-machining position.

Removing means may also be provided for removing machined workpieces from the system after they have been discharged by the machine charging wheel.

In accordance with the invention, the system automatically and continuously orients and feeds the workpieces in sequence to the machine tool for machining operations and automatically discharges them from the machine tool upon completion of the machining operation.

The accompanying drawings which are incorporated in and constitute a part of this specification illustrate an embodiment of the invention and, together with the description, serve to explain the principles of this invention.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

Figure 1:
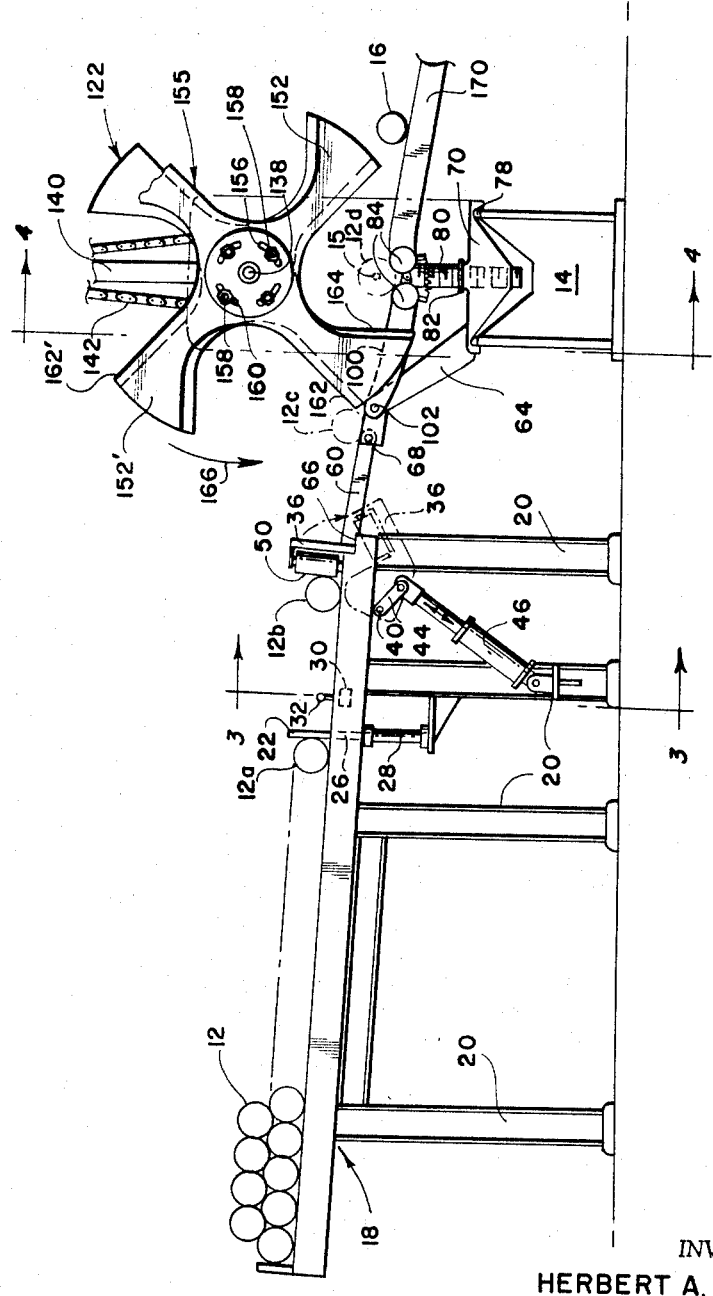
FIG. 1 is a side elevation of the automatic feeding and discharging system of this invention illustrating its relationship with a pipe lathe.

As shown in FIG. 1, the present invention provides an automatic system for orienting, feeding, machining, and discharging cylindrical workpieces of substantial length, and more particularly asbestos-cement pipes, in cooperation with a machine tool, particularly a pipe lathe, to automatically achieve machining of the workpieces. Unmachined pipe lengths 12 are stockpiled and then oriented and fed in sequence on an automatic and continuous basis by the system of this invention to a machine tool 14. Upon completion of the machining operation, machined pipe lengths 16 are automatically discharged by the system of this invention and may be removed to another station for subsequent treatment, such as a machine for flextesting the machined pipe.

In accordance with the invention, means are provided for automatically orienting and feeding a continuous supply of unmachined lengths of pipe to the machine tool. As embodied and shown in FIG. 1, this means includes a downwardly inclined feed table 18 adapted to hold a plurality of unmachined pipe lengths 12. Feed table 18 is of sufficient inclination to permit the pipes 12 to roll down the table under the force of gravity toward machine tool 14. At any one time, a plurality of pipes 12 can be placed on table 18 by the machine operators, thereby relieving them of the need to continuously supply pipes to the automatic system of the invention. Feed table 18 is also of sufficient width to accommodate the various conventional lengths of pipes that are required to be machined and is supported in an inclined position by table legs 20.

In accordance with the invention, gating means are provided for stopping the lengths of pipe rolling down the inclined feed table at an intermediate holding position on the feed table and for releasing the workpieces one at a time from the intermediate holding position. As embodied and shown in FIGS. 1 and 2, this means comprises a plurality of retractable gates 22 that extend upwardly through slots 24 in the surface of feed table 18. Gates 22 act as stops and provide an intermediate holding position for pipes 12 rolling down feed table 18. Gates 22 are connected to a piston rod 26 of an air-operated cylinder 28 that is mounted to the underside of feed table 18.

The gating means further includes a sensing device or limit switch 30 having an actuating arm 32 that projects upwardly through slot 34 in table 18 and is located down the inclined surface of feed table 18 from gates 22. Limit switch 30 is adjustable with respect to feed table 18 so that the distance between arm 32 and gates 22 can be varied to accommodate pipes of varying diameter. As will be more fully described below, limit switch 30 partially controls the movement of gates 22.

In keeping with the concept of this invention, machine cycling means are provided to control the sequence and timing of certain operations performed by the automatic system of this invention. As embodied, this machine cycling means comprises electric control circuits that actuate pneumatic and hydraulic cylinders, and other machine mechanisms in a timed progression of steps. The machine cycling means itself is not illustrated in detail in the drawings since it is conventional and is within the knowledge of those skilled in the art.

In operation, air-operated cylinder 28 is actuated by the machine cycling means to retract gates 22 below the surface of feed table 18. This permits the plurality of pipes 12, which have been restrained at the intermediate holding position by gates 22, to roll further down feed table 18 under the force of gravity. Upon contact of lowermost pipe 12a with actuating arm 32 of limit switch 30, limit switch 30 signals the machine cycling means to reactuate cylinder 28 and return gates 22 to their upwardly extended position.

Actuating arm 32 is adjustably positioned within slot 34 at a given distance from gates 22 to accommodate the diameter of pipe being machined, so that gates 22 will return to their extended position between the lowermost pipe 12a and the next succeeding pipe in time to stop further movement of the remaining pipes on feed table 18. In this manner, the gating means releases the pipes 12 one at a time, so that they can be fed in sequence to machine tool 14.

Figure 3:
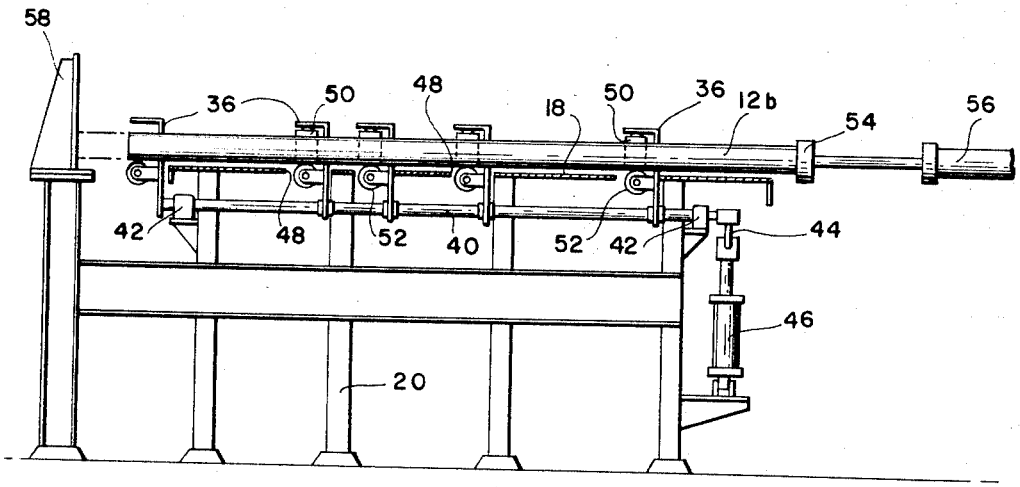
FIG. 3 is a sectional view taken along the line 3—3 of FIG. 1.

In accordance with the invention, aligning means are provided at the lower end of inclined feed table 18 to arrest movement of pipe 12a at a workpiece-aligning position after its release by the gating means and to longitudinally and axially align the pipe with respect to the axis 15 of machine tool 14. As embodied and as shown in FIGS. 1 and 3, this aligning means comprises a plurality of arms 36 that are rigidly attached to a shaft 40. Shaft 40 is mounted for rotation in supports 42 and is operatively connected to hydraulic cylinder 46 through radial crank 44 for rotary movement responsive to actuation of cylinder 46. Supports 42 and hydraulic cylinder 46 are secured to legs 20 of feed table 18.

Figure 2:
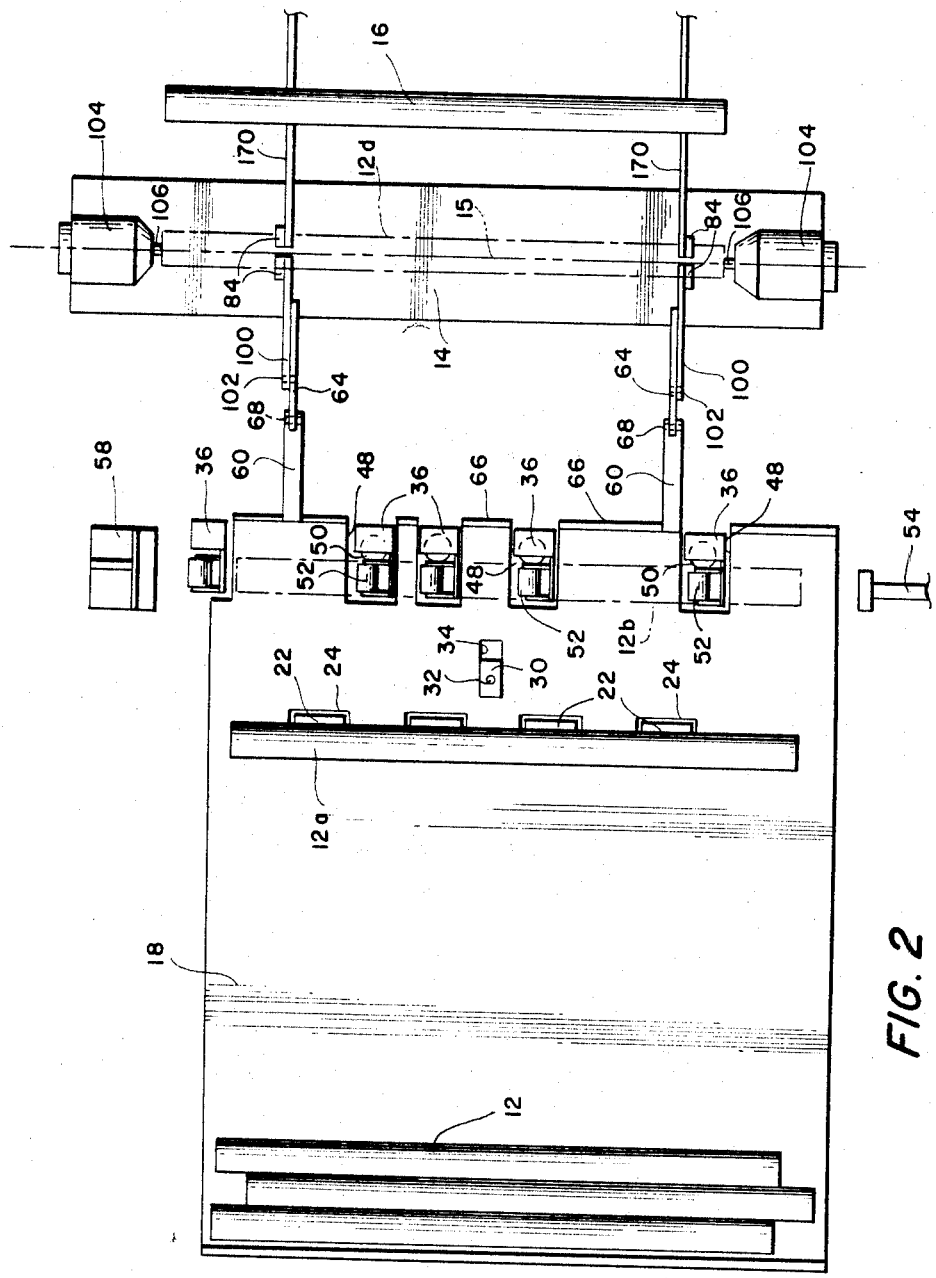
FIG. 2 is a top view of the system shown in FIG. 1, with the machine-charging wheels removed for clarity.

As best shown in FIG. 2, a plurality of arms 36 extend into slots 48 at the lower end of feed table 18, and each arm 36 includes a vertical roller 50 and a horizontal roller 52, rotatably mounted to the arm. As best shown in FIG. 3, when arms 36 are in an extended position and are located within slots 48 at the lower end of table 18, vertical rollers 50 are substantially perpendicular to the surface of feed table 18, and the upper surfaces of horizontal rollers 52 are substantially flush with, but spaced slightly above, the surface of feed table 18.

As depicted in FIG. 1, pipe 12a, after being released by the gating means and having rolled down feed table 18, is stopped by vertical rollers 50 and supported by horizontal rollers 52 of arms 36 at the workpiece-aligning position, and comes to rest in the position as shown by pipe 12b in FIGS. 1 and 2.

Arms 36 and their corresponding slots 48 in feed table 18 are spaced, as shown in FIGS. 2 and 3, so that different lengths of pipe may be accommodated by the automatic feeding and discharging system of this invention.

As also shown in FIGS. 2 and 3, the aligning means further includes a pusher 54, which is operated by hydraulic cylinder 56, and a fixed stop 58. The stroke of hydraulic cylinder 56 is actuated by the machine cycling means to push pipe 12b along rollers 50 and 52 and against fixed stop 58 to align the pipe with respect to the machine tool axis 15, as will be described in further detail below.

After the end of pipe 12b comes to rest against stop 58, the machine cycling means again actuates hydraulic cylinder 56 and retracts pusher 54. The cycling means also simultaneously actuates hydraulic cylinder 46 to rotate shaft 40 and pivot arms 36 to a retracted position, as shown in phantom in FIG. 1. Retraction of arms 36 then permits aligned pipe 12b to roll off the end of feed table 18.

As shown in FIGS. 1 and 2, a pair of transfer bars 60 are provided between the lower end of feed table 18 and machine tool charge arms 64 to transfer pipe 12b to a machine-charging position, as depicted by pipe 12c in FIG. 1. One end of each transfer bar 60 rests on an extended lip 66 that projects from the lower end of feed table 18 and lies flush with the upper surface of the feed table. The other end of each bar 60 is pivotally connected to charge arms 64 by pivot pins 68.

Each machine charge arm 64 (FIGS. 1 and 5) is mounted on a platform 70, and each platform 70 is mounted to reciprocate longitudinally with respect to machine tool axis 15 along ways 78.

Figure 5:
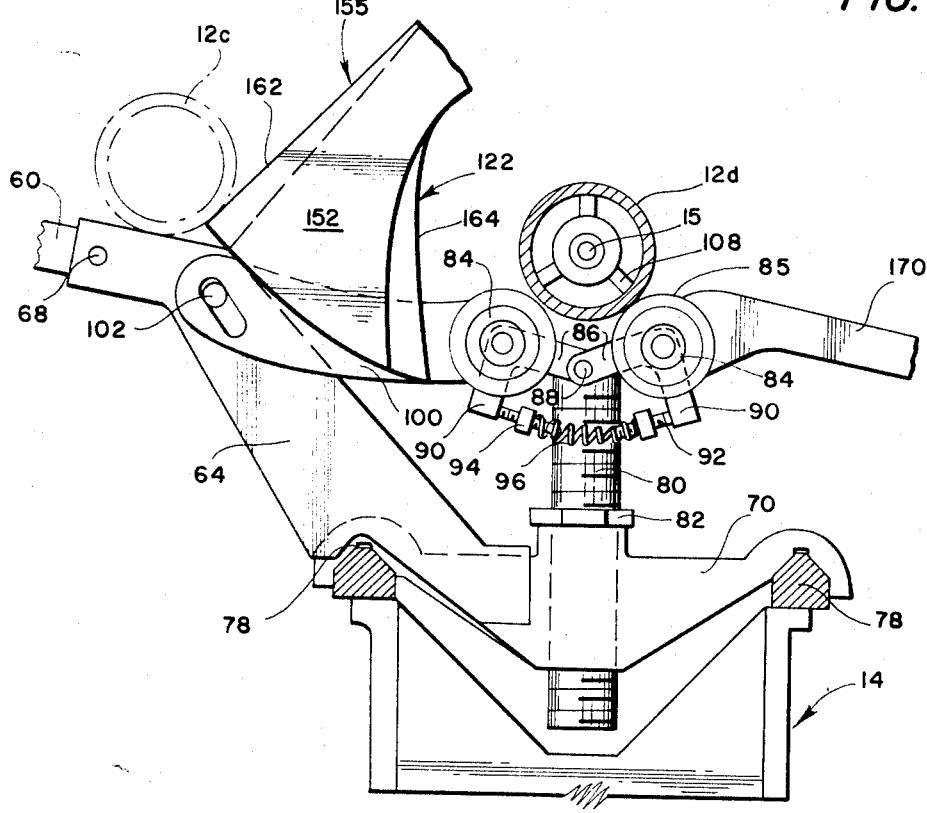
FIG. 5 is an enlarged fragmentary sectional view taken along the line 5—5 of FIG. 4.

As best shown in FIG. 5, a threaded post 80 is mounted on each platform 70 and is vertically adjustable with respect to platform 70 by turning an adjusting nut 82. Each post 80 supports a pair of springloaded centering rollers 84 that rotatably support a pipe in the machining position concentric with axis 15 of machine tool 14, as depicted by pipe 12d in FIGS. 1 and 5. Each roller 84 is covered with a sheet of polyurethane 85 and is rotatably mounted on a bracket 86, which is pivotally connected at 88 to the top of each post 80. Each bracket 86 includes a crank arm 90 having a stud 92 and a nut 94 threaded to the stud. A spring 96 is located between the nuts 94 on each stud 92 and urges brackets 86 and centering rollers 84 to pivot about pivot point 88 toward machine tool axis 15 to support the pipe during the machining operation.

The height of rollers 84, and hence the location of the center line of pipe 12d supported by the rollers, can be adjusted by turning adjusting nut 82 to vary the height of post 80 with respect to platform 70. This adjustment permits centering rollers 84 to be raised or lowered with respect to the machine tool axis 15 to accommodate the diameter of the pipe to be machined.

As shown in FIGS. 1, 2, and 5, charge rails 100 are further provided between machine charge arms 64 and the pair of centering rollers 84 of each platform 70 to transfer pipe from the machine-charging position, as depicted by pipe 12c, to the machining position, as depicted by pipe 12d. Each charge rail 100 is connected at one end to machine charge arm 64 through a pin-and-slot engagement 102 and is pivotally connected at its other end to the bracket 86 on the charging side of the machine tool axis 15. The pin-and-slot engagement 102 permits each charge rail 100 to be pivotally adjusted with respect to charge arm 64, as the vertical height of the pair of centering rollers 84 is adjusted with respect to platform 70.

Figure 4:
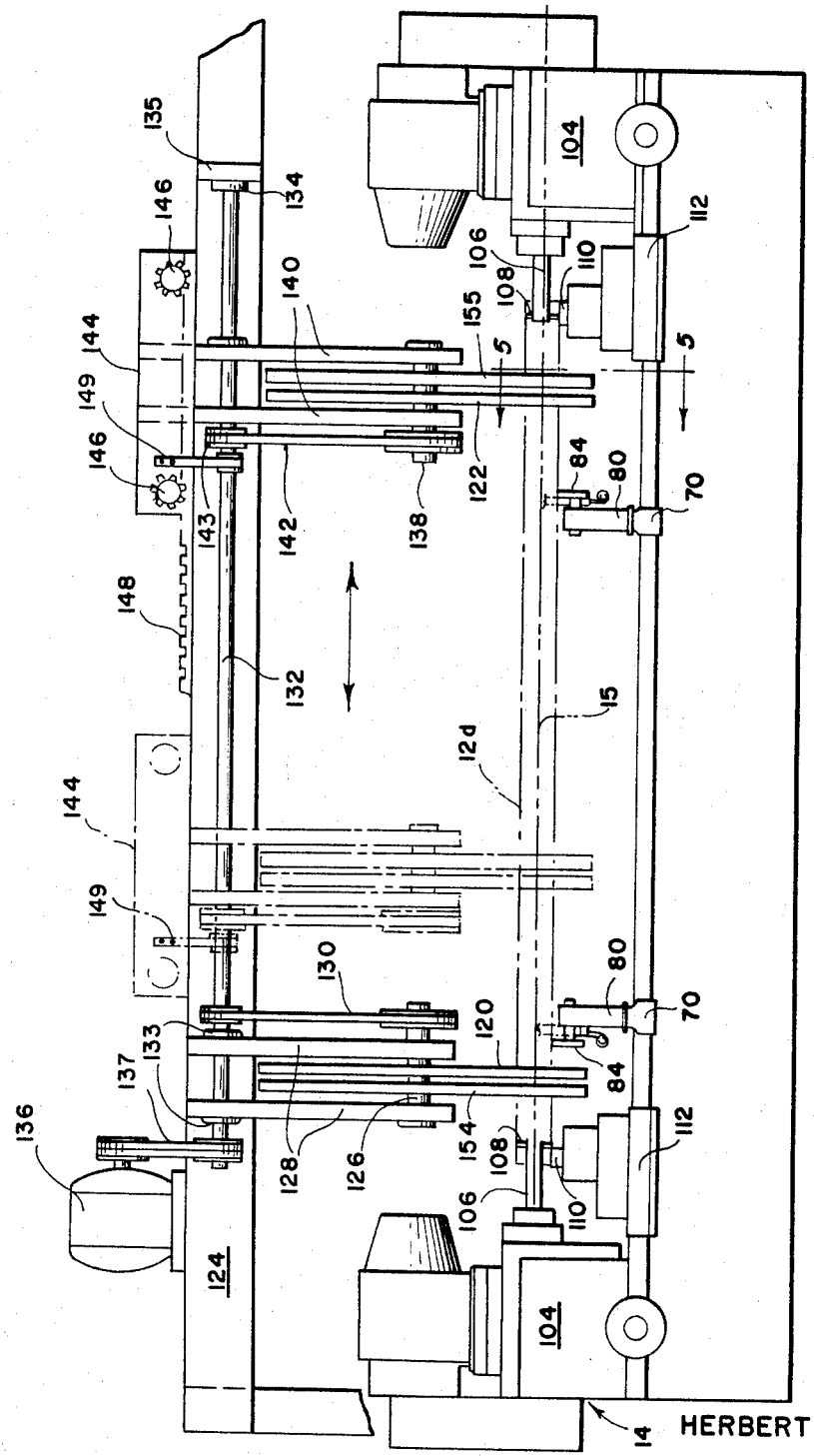
FIG. 4 is an enlarged sectional view taken along the line 4—4 of FIG. 1.

As shown in FIG. 4, machine tool 14 includes a pair of spindle heads 104 which are mounted for reciprocal movement along ways 78 in a direction parallel to machine tool axis 15 by conventional mechanisms well known to those skilled in the art. The reciprocal movement of spindle heads 104 is timed and controlled by the machine cycling means. Each spindle head 104 includes a spindle 106 and an air-operated chuck 108 mounted on the end of each spindle 106 that engages and then grips the internal surfaces of both ends of pipe 12d for rotary movement on the machine tool axis 15.

Machine tool 14 also includes a pair of cutting tools 110 for machining the external surface of each end of pipe 12d. Each tool 110 is mounted on a platform 112 which in turn is mounted for reciprocal movement along ways 78 in a direction parallel to machine axis 15.

In accordance with the invention, means are provided for automatically charging unmachined pipes from the machine-charging position to the machining position for the desired machining operation, and for discharging machined pipes from the machining position upon completion of the machining operation. As embodied and best shown in FIGS. 1 and 4, this means comprises machine-charging wheels 120 and 122 which are suspended by brackets from a frame 124 for rotation on axes parallel to and spaced apart from machine tool axis 15.

Charging wheel 120 is secured to a shaft 126 which is rotatably mounted in a stationary bracket 128 of frame 124. Charging wheel 120 is rotated by a sprocket and chain drive connection 130 between shaft 126 and a drive shaft 132. Drive shaft 132 is rotatably supported at one end by bearings 133 which are mounted in stationary bracket 128, and at the other end by a bearing 134 mounted in bearing bracket 135. Drive shaft 132 is restrained against axial movement by bearings 133 and 134 and is rotated by gear motor 136 through a pulley and belt drive 137.

Charging wheel 122 is secured to a shaft 138 which is rotatably mounted in a movable bracket 140 and is rotated by a sprocket and chain drive connection 142 between shaft 138 and drive shaft 132. Bracket 140 depends from and is secured to a carriage 144, which includes pinion gears 146 that engage a rack 148 on frame 124 for movement of carriage 144 along the frame.

Sprocket 143 of sprocket and chain drive 142 rides on a spline (not shown) on drive shaft 132, and bracket 140 is slidably mounted on drive shaft 132 to permit sprocket 143 and bracket 140 to slide axially along drive shaft 132 with movement of carriage 144. Sprocket 143 is restrained against axial movement independent of movement of carriage 144, by bearing bracket 149 that depends from carriage 144 and is slidably mounted on drive shaft 132. This permits longitudinal movement of carriage 144 and bracket 140 along frame 124 to vary the distance between charging wheels 120 and 122, as shown in phantom in FIG. 4, to accommodate the length of the pipe to be machined.

The actuation of gear motor 136 and the rotation of charging wheels 120 and 122 responsive to actuation of gear motor 136 is timed and controlled by the machine cycling means, as will be further described in the description of the operation of the system of this invention.

As shown in FIG. 1, each charging wheel 120 and 122 consists of a plurality of spaced radial arms 152 separated by substantial indentations. A second wheel 154 and 155 is associated with each charging wheel 120 and 122, respectively. Wheels 154 and 155 are identical in size and configuration to charging wheels 120 and 122 but are only loosely mounted on shafts 126 and 138, respectively, and are thus rotatably adjustable with respect to the charging wheels 120 and 122.

To permit rotational adjustment of wheels 154 and 155 with respect to charging wheels 120 and 122, respectively, arcuate slots 156 are provided in the hub of wheels 154 and 155, as best shown in FIG. 1, through which extend threaded studs 158 that are secured to the hub of charging wheels 120 and 122. The wheels are locked together in their desired relationship by locknuts 160.

Consonant with the invention, this arrangement provides means for increasing or decreasing the space between the radial arms 152 of charging wheels 120 and 122 to accommodate varying diameters of pipe to be machined and to ensure an accurate and precise charging of the pipe onto centering rollers 84.

In operation and as shown in FIG. 1, a length of pipe 12c is held at the machine-charging position on charge arms 64 by the trailing edge 162 of an arm 152 on each set of wheels 120 and 154, and 122 and 155. Upon rotation of charging wheels 120 and 122, pipe 12c is permitted to roll by gravity down charge rails 100 and onto centering rollers 84. Pipe 12c would then be in the pipe machining position, depicted by pipe 12d in FIG. 1.

Rotation of charging wheels 120 and 122 simultaneously engages the leading edge 164 of an arm 152 of each set of wheels with a pipe 12d at the pipe machining position to push it off centering rollers 84 and discharge it from the machine tool.

In accordance with the invention, means are provided for removing machined pipe after they have been discharged from the machine tool by charging wheels 120 and 122. As embodied and as shown in FIGS. 1 and 2, this means comprises a pair of downwardly inclined removal rails 170 that permits machined pipe 16 to roll by gravity away from machine tool 14 after it has been discharged by charging wheels 120 and 122. Removal rails 170 are pivotally connected to the bracket 86 of each pair of centering rollers 84 on the discharging side of machine tool axis 15. This arrangement permits the height of centering rollers 84 to be adjusted with respect to machine tool axis 15 to accommodate the various diameters of pipe to be machined. Removal rails 170 feed machined pipe 16 to the next succeeding operation in the manufacture of asbestos-cement pipe such as a flextester (not shown).

In operation of the automatic system of this invention, unmachined pipes 12 are placed on feed table 18 by the machine operators, and the pipes roll down the table under gravity until they come to rest against gates 22. The operators supply a plurality of pipes 12 to feed table 18 to maintain the automatic system of this invention on a continuous basis.

The automatic feeding and discharging system is then adjusted depending upon the length and diameter of the pipe to be machined. Machine charging wheel 122 is initially adjusted with respect to machine charging wheel 120 by movement of carriage 144 along rack 148. The machine charging wheels are preferably located with respect to each other so that the length of pipe to be machined is engaged by the arms 152 of the wheels at a substantial distance in from the ends of the pipe.

Roller platforms 70 and tool platforms 112 are then axially adjusted along ways 78 to locate rollers 84 and tools 110, respectively, in the proper position, as shown in FIG. 4, depending upon the length of pipe to be machined. Securing means (not shown) may be provided to hold platforms 70 in the desired location during the machining operation.

As roller platforms 70 are moved along ways 78, transfer bars 60 are lifted off by the machine tool operators and relocated on lips 66 on the lower end of feed table 18. Alignment of transfer bars 60 with rollers 84 provides support for the particular length of pipe being fed to machine tool 14 by the system of this invention.

The height of centering rollers 84 is then adjusted by rotation of adjusting nut 82 to accommodate the diameter of the pipe to be machined, so that the center line of the pipe, which is supported in the machining position by rollers 84, is concentric with the machine tool axis 15.

Additionally, wheels 154 and 155 are rotatably adjusted with respect to machine charging wheels 120 and 122, respectively, to increase or decrease the size of the indentations between the arms 152 of each set of wheels to accommodate the diameter of pipe to be machined. This adjustment ensures that a pipe will be held at the machine-charging position and that it will be precisely charged to the machining position and discharged from the machining position of machine tool 14.

Automatic adjusting means may be provided for automatically adjusting carriage 144 and platforms 70 and 112 to accommodate the length of pipe to be machined, and for automatically adjusting the height of centering rollers 84 and the size of the indentations between the arms 152 of each set of charging wheels to accommodate the diameter of the pipe to be machined, without departing from the scope of this invention.

Limit switch 30 is then adjusted with respect to feed table 18, so that the switch actuating arm 32 is spaced the proper distance from gates 22, which will depend upon the diameter of the pipe to be machined. The position of arm 32 is adjusted, so that upon contact of the lowermost pipe 12a with the arm, after the pipe has been released by retraction of gates 22, switch 30 will signal the machine cycling means and return gates 22 to their extended position, as shown in FIG. 1, between the lowermost pipe and the next lowest pipe. This separates a pipe from the plurality of pipes 12 on feed table 18 to permit the pipes to be fed one at a time and in sequence to machine tool 14.

The machine cycling means is then initiated to control the sequence and timing of the operations performed by the automatic system of this invention. The machine cycling means initially actuates air-operated cylinder 28 which retracts gates 22 below the surface of feed table 18 and permits unmachined pipes 12 to roll down feed table 18 by gravity toward machine tool 14. Gates 22 are maintained in a retracted position until lowermost pipe 12a contacts actuating arm 32 of limit switch 30. Upon contact with arm 32, limit switch 30 signals the machine cycling means to reactuate air-operated cylinder 28 and return gates 22 to their extended or initial position, as shown in FIG. 1, between pipe 12a and the next pipe rolling down feed table 18. This separates pipe 12a from the remaining pipes which are now stopped at the intermediate holding position by gates 22.

Pipe 12a then rolls down feed table 18 until it comes to rest against vertical rollers 50, and is supported on horizontal rollers 52 of arms 36 in the position as shown by pipe 12b in FIG. 1. In a timed sequence of steps, the machine cycling means then actuates pusher 54, which pushes pipe 12b along rollers 50 and 52 and against fixed stop 58. This adjustment aligns pipe 12b both axially and longitudinally with respect to machine tool axis 15 permitting it to be fed to and discharged from machine tool 14 by the automatic system of this invention.

Pusher 54 then retracts and the machine cycling means simultaneously actuates hydraulic cylinder 46 to pivot arms 36 on shaft 40 to the position as shown in phantom in FIG. 1. Pivotal movement of arms 36 lowers rollers 50 and 52 and permits aligned pipe 12b to roll off the end of feed table 18 and onto transfer bars 60.

For convenience, the operation of the machine charging wheels will be described as if the system had been operating for a time and that machined pipe 16 was ready to be discharged from machine tool 14. It will be understood, of course, that the charging of the first pipe to the machine tool would be carried out in the same manner but without the simultaneous discharge of a machined pipe.

The initial position of machine charging wheels 120 and 122, as shown by wheel 122 in FIG. 1, stops pipe 12b rolling along transfer bars 60 at the machine-charging position on charge arms 64, where it rests against the trailing edge 162 of an arm 152 of each set of wheels 120 and 154, and 122 and 155. Pipe 12b is now at the position depicted by pipe 12c in FIG. 1.

By an automatic timed progression or sequence of steps, the machine cycling means then actuates gear motor 136, which simultaneously rotates charging wheels 120 and 122 one-quarter (¼) turn in the direction of arrow 166, as shown in FIG. 1. Rotation of the charging wheels 120 and 122 permits pipe 12c to roll down across charge rails 100 and onto centering rollers 84. Pipe 12c is now at the machining position as depicted by pipe 12d in FIG. 1. At the same time, the rotation of the charging wheels one-quarter (¼) turn engages the leading edge 164 of an arm 152 of each set of wheels 120 and 154, and 122 and 155 with machined pipe 16 and pushes it off of centering rollers 84 and onto removal rails 170. Machined pipe 16 then rolls by gravity down removal rails 170 to the next succeeding operation in the manufacture of the pipe.

Responsive to the machine cycling means, spindle heads 104 advance longitudinally along ways 78 toward each other until chucks 108 on each spindle 106 are inserted into opposite ends of pipe 12d. Chucks 108 are then simultaneously expanded to engage and grip for rotary movement the internal surface of pipe 12d. Spindles 106 then start to rotate pipe 12d concentric with axis 15 of machine tool 14. Responsive to the machine cycling means, tools 110 are moved transverse to the machine tool axis by a suitable feed mechanism and engage the external surfaces of both ends of pipe 12d to perform the desired machining operation.

During the machining operation, the machine cycling means will reactuate air-operated cylinder 28 and retract gates 22 to permit the next pipe to roll down feed table 18 toward the workpiece-aligning position, where it is stopped by vertical rollers 50 of lever arms 36. Upon alignment of this pipe against fixed stop 58 by pusher 54, in the manner described above, lever arms 36 are lowered and the pipe is permitted to advance to the machine-charging position, where it is stopped by the trailing edge 162' of the next arm 152' of each set of wheels 120 and 154, and 122 and 155. The next pipe is now in position to be charged to the machining position upon completion of the machining operation.

With this cycle completed, the machine cycling means again actuates cylinder 28 and retracts gates 22 to permit the next pipe to roll down the feed table to the workpiece-aligning position.

Thus, during the machining operation, a pipe 12c is at the machine-charging position, a pipe 12b is at the workpiece-aligning position, and the remaining pipes 12 are lined up at the intermediate holding position.

When machining is complete, the machine cycling means causes tools 110 to return to their initial position, spindles 106 to stop rotating, chucks 108 to release, and spindle heads 104 to retract axially away from the ends of machined pipe 16. Machine charging wheels 120 and 122 then rotate one-quarter (¼) turn, which permits the next pipe, now at the machine-charging position, to roll down across charge rails 110 and onto centering rollers 84, and simultaneously pushes machined pipe 16 off centering rollers 84 and onto removal rails 170. The next pipe is now in position for machining and the entire sequence of steps, as described above, is repeated.

The automatic feeding and discharging system of this invention will thus operate on a continuous basis as long as there are pipes to be machined on feed table 18, feeding unmachined pipes 12 to machine tool 14, machining them, and discharging machined pipes 16 in a planned sequence of steps.

While a system has been shown for automatically feeding and discharging asbestos-cement pipes, it will be appreciated that similar cylindrical-shaped articles of substantial length which require external machining operations are also compatible with the system of this invention.

Additional means may also be provided for automatical supplying unmachined pipes 12 to feed table 18 without departing from the scope of this invention.

The present invention, therefore, provides a practical means for orienting and feeding, in sequence, a plurality of cylindrical workpieces of substantial length, and more particularly asbestos-cement pipes, on an automatic and continuous basis to a machine tool, and for discharging them from the machine tool after the machining operation has been completed. This system relieves the machine operators of a substantial amount of time and effort that was previously required to perform these operations, thereby increasing the efficiency and economy of the entire machining operation.

What is claimed is:

1. In a machine tool having an axis and a pair of axially aligned chucks for securing a cylindrical workpiece at its end for rotary movement on the machine tool axis, a system for automatically feeding in sequence workpieces to the machine tool for machining, and for discharging machined workpieces from the machine tool, which system comprises:
    (a) a downwardly inclined feed table of sufficient length and inclination to impart rolling motion to a plurality of unmachined workpieces thereon in a direction substantially normal to and toward the machine tool axis;
    (b) gating means for stopping the plurality of unmachined workpieces as they roll down the feed table at an intermediate holding position on the feed table and for releasing the workpieces one at a time from the intermediate holding position;
    (c) aligning means at the lower end of the feed table for arresting movement of a workpiece at a workpiece-aligning position after its release by the gating means, and for aligning the workpiece with respect to the machine tool axis, said aligning means permitting advancement of an aligned workpiece to a machine-charging position adjacent the machine tool chucks;
    (d) machine cycling means for actuating and controlling the gating means and the aligning means to feed and align workpieces in sequence to the machine-charging position;
    (e) a machine charging wheel rotatably mounted on an axis parallel to and spaced apart from the machine tool axis, said wheel having a plurality of spaced radial arms separated by indentations; and
    (f) the machine cycling means rotating said wheel to charge an unmachined workpiece from the machine-charging position to a workpiece-machining position concentric with the axis of the machine tool chucks and simultaneously to discharge a machined workpiece from the workpiece-machining position, whereby workpieces are automatically and continuously fed in sequence to the machine tool for machining operations and are automatically discharged from the machine tool upon completion of machining.

2. The invention as defined in claim 1, which includes removing means for removing machined workpieces from the system after they have been discharged by the machine charging wheel.

3. The invention as defined in claim 1, in which the gating means comprises:
   (a) a plurality of retractable gates that extend through the feed table and stop the plurality of unmachined workpieces at the intermediate holding position;
   (b) retracting means actuated and controlled by the machine cycling means to retract the gates and release the workpieces one at a time from the intermediate holding position; and
   (c) sensing means located within the path of the workpieces released by the retracted gates, said sensing means extending the gates upon contact with the released workpiece between the released workpiece and next workpiece of the plurality of workpieces on the feed table, said gating means thereby releasing the workpieces one at a time from the intermediate holding position.

4. The invention as defined in claim 1, wherein the aligning means comprises:
   (a) a plurality of arms pivotally mounted on the feed table;
   (b) pivoting means actuated and controlled by the machine cycling means to reciprocatingly pivot the arms between an extended and a retracted position;
   (c) a first roller, rotatably mounted to each arm on an axis that is normal to the inclined feed table when the arm is in the extended position to arrest movement of a workpiece released by the gating means at the workpiece-aligning position;
   (d) a second roller, rotatably mounted to each arm on an axis that is perpendicular to the first roller axis and parallel to the inclined feed table when the arm is in the extended position to support the workpiece at the workpiece-aligning position;
   (e) advancing means actuated and controlled by the machine cycling means for pushing the workpiece at the workpiece-aligning position in an axial direction along said first and second rollers and against a fixed stop to longitudinally align the workpiece with respect to the machine tool; and
   (f) the machine cycling means actuating the pivoting means to pivot the arms to the retracted position substantially below the plane of the feed table to permit advancement of an aligned workpiece to the machine-charging position.

5. The invention as defined in claim 1, which includes workpiece centering means for centering a workpiece at the workpiece-machining position concentric with the machine tool axis for engagement by the machine tool chucks and for rotatably supporting the workpiece during the machining operation.

6. The invention as defined in claim 5, in which the workpiece centering means comprises:
   (a) a pair of brackets pivotally mounted on the machine tool on an axis parallel to and spaced below the machine tool axis;
   (b) a roller, rotatably mounted on each bracket on an axis parallel to said pivot axis; and
   (c) spring means mounted between said brackets tending to pivot the rollers about the pivot axis in a direction toward the machine tool axis.

7. The invention as defined in claim 6, in which the rollers are vertically adjustable in a direction perpendicular to the machine tool axis.

8. The invention as defined in claim 1, which includes two machine charging wheels rotatably mounted on the same axis, at least one of said wheels being adjustable along its axis to vary the distance between the charging wheels.

9. The invention as defined in claim 8, which includes a second wheel associated with each of said charging wheels, said second wheel being rotatably adjustable about the charging wheel axis to vary the size of the circumferential openings of the indentations of the charging wheels.

10. The invention as defined in claim 8, wherein the trailing edge of the arms of the rotating charging wheels hold a workpiece at the machine-charging position, and, upon rotation of the charging wheels, permits the workpiece to advance to the workpiece-machining position, the leading edge of said arms simultaneously engaging and discharging a workpiece from the workpiece-machining operation.

References Cited
UNITED STATES PATENTS

| | | | |
|---|---|---|---|
| 2,272,179 | 2/1942 | Allardt | 221—298 X |
| 3,055,245 | 9/1962 | McKay | 10—107 |

GERALD M. FORLENZA, *Primary Examiner.*

F. E. WERNER, *Assistant Examiner.*